3,349,752
POULTRY BROODER
Raymond E. Murphy, Salisbury, Md. 21801
Filed Mar. 31, 1966, Ser. No. 540,474
7 Claims. (Cl. 119—32)

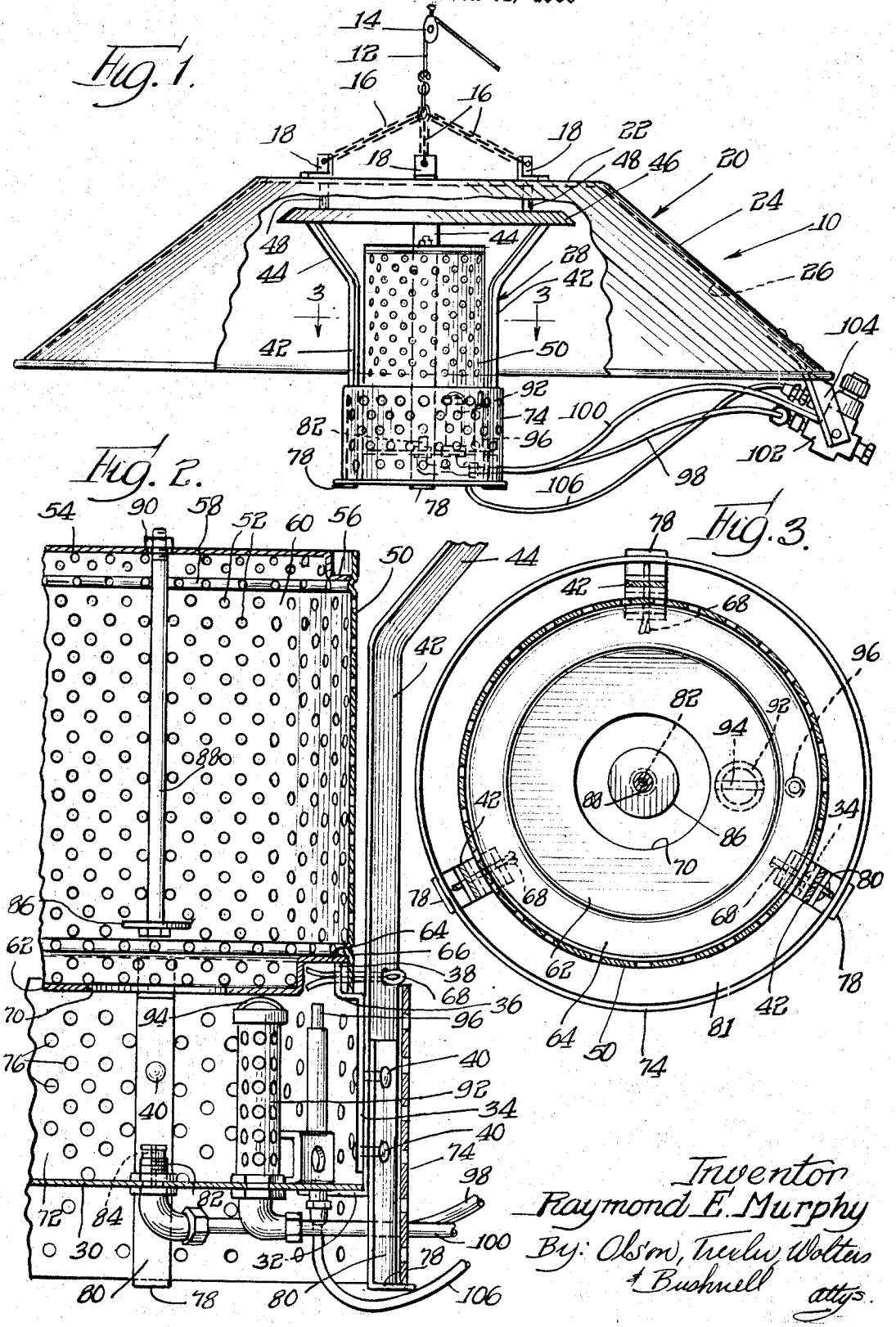

ABSTRACT OF THE DISCLOSURE

A poultry brooder is disclosed which includes a gas burning heat source suspended beneath a hood. The heat source includes a perforated shell within which gas is burned, and a single gas jet and baffle construction for forming and directing a sheet of fuel gas for ignition adjacent the shell.

---

The present invention relates to a novel poultry brooder, and more specifically to a novel brooder adapted to burn gas as a source of energy.

As will be understood, brooders of the general type contemplated herein are suspended or otherwise supported at spaced intervals throughout a poultry house for the purpose of enabling the birds and particularly young chicks to keep warm. The floor of a poultry house is usually covered with a litter material which may, for example, be formed from wood chips, sawdust, corncobs and the like which is both highly flammable and also quite dusty. Such litter materials not only provide a significant fire hazard, but the dust therefrom may interfere with the proper operation of a brooder.

An important object of the present invention is to provide a novel gas burning poultry brooder which is not only safe and reliable but which is capable of operating within the dirty and dusty environment of a poultry house with a minimum of interference therefrom.

A further and more specific object of the present invention is to provide a novel gas burning poultry brooder which is constructed so as to minimize any possibility of dirt or dust interfering with the proper operation thereof and also to enable the device to be quickly and easily serviced in the event cleaning does become necessary.

Still another important object of the present invention is to provide a novel gas burning poultry brooder constructed for more effectively and efficiently utilizing the energy provided by the gas being burned so as to minimize operating costs.

Still another important object of the present invention is to provide a novel gas burning poultry brooder of the above-described type which is of relatively simple and economical construction.

Other objects and advantages of the present invention will become apparent from the following description and the accompanying drawings wherein:

FIG. 1 is a side elevational view, partially broken away, showing the poultry brooder incorporating features of the present invention;

FIG. 2 is an enlarged fragmentary partial sectional view showing a portion of the structure in greater detail; and FIG. 3 is a cross-sectional view taken along lines 3—3 in FIG. 1.

Referring now more specifically to the drawings wherein like parts are designated by the same numerals throughout the various figures, a poultry brooder 10 incorporating features of the present invention is shown in FIG. 1. The brooder is adapted to be supported above the floor of a poultry house, not shown, in a variety of known ways. For example the brooder may be suspended from an overhead support by means of a cable 12 extending around a pulley 14. The cable is connected by chains 16 and brackets 18 to the top of the brooder 10. If desired an opposite end of the cable 12 may be connected with a winch or other suitable means, not shown, for enabling the brooder to be vertically adjusted to any desired position above the floor.

The brooder 10 comprises a hood or reflector 20 formed from a suitable sheet material. Preferably the hood is formed from a material such as aluminum providing a bright surface for more efficiently reflecting radiant heat energy down toward the floor of the poultry house as will be described more in detail below. The hood 20 is formed with a closed or imperforate top section 22 which, in the embodiment shown, is generally flat and is welded or otherwise secured to the brackets 18. A frusto-conical section 24 is formed integrally with or joined to section 22 for providing a downwardly and outwardly flaring bottom or reflecting surface 26.

Mounted beneath the hood 20 is an assembly 28 in which fuel is burned for providing a source of heat. The assembly 28 has a base plate 30 mounted on and welded or otherwise secured to inturned end portions 32 of upstanding brackets or straps 42 which are substantially equally spaced around the base plate. Straps or brackets 34 are secured to the straps 42 by rivets 40 and upper end portions of the straps 34 are formed to provide inturned or horizontal sections 36 merging with upstanding terminal end sections 38 for a purpose described below. The straps or brackets 42 extend upwardly and have flaring upper end portions 44 welded or otherwise secured to an imperforate circular metal baffle or reflector 46 which is spaced beneath the top section 22 of the hood. The baffle 46 serves to protect the top section of the hood from the heat generated in the assembly 28. Furthermore, the baffle section 46 serves to support the assembly 28 beneath the hood through a plurality of straps or spacer members 48 which are substantially equally spaced around the baffle member and which are secured thereto and to the underside of the hood. Preferably the straps or spacer elements 48 are in alignment with the brackets 18 whereby the weight of the assembly 28 will be substantially supported directly through the brackets 18 and chains 16 rather than by relatively thin sheet metal top section 22 of the hood.

A substantially cylindrical shell 50 is disposed on and supported by the horizontal sections 36 of the brackets 34 for defining a chamber 60 in which the fuel or gas is burned as described more fully below. The shell 50 is formed from a sheet material capable of maintaining its strength at high temperatures. For example shell 50 is preferably formed from stainless steel. Apertures or perforations 52 are formed through the wall of the shell 50 and are closely spaced generally uniformly throughout the length and entirely around the shell. The small apertures provide numerous passageways permitting the escape of burning gases as described more fully below and also promote heating of the shell to a high temperature and provide the shell with numerous edges and surfaces for increasing the emission of radiant heat from the shell.

An upper end of the shell 50 is closed by an imperforate end plate 54 having a flange 56 resting on a bead 58 formed integrally with and projecting inwardly from the wall of the shell. The lower end of the combustion chamber 60 defined by the shell is partially closed by an end member 62 having a peripheral flange 64 projecting beneath an inwardly extending bead 66 formed integrally with the wall of the shell. As shown in FIG. 2, the flange 64 projects over the upper edge of the bracket end section 38 and the lower end of the shell 50 rests on the bracket section 36. Pins 68 extend through the straps or brackets 42, the lower margin of the shell 50 and the end sections 38 of the brackets 34 for releasably interconnecting the parts. The end member 62 has a relatively large central opening 70 for permitting the entry of fuel or gas to the chamber 60 as will be described below.

As shown in FIG. 2, the construction of the assembly 28 is such that the base plate 30 is axially offset well below the end member 62 and shell 50 so as to define a space 72. The periphery of this space is enclosed by a perforated cylinder 74 preferably formed from sheet steel and having small apertures 76 spaced uniformly therearound. The cylindrical shell 74 has a diameter greater than the shell 50 and is supported on laterally outwardly projecting end sections 78 of brackets or straps 80 which are secured to lower end portions of the straps or brackets 42 by the previously mentioned rivets or fasteners 40. The cylindrical member or guard 74 serves to restrict the entry of dust, foreign material, birds and the like into the chambers 72 and 60 and also serves to minimize or eliminate the occurrence of drafts which might interfere with the operation of the device. At the same time the cylindrical member 74 permits the entry of air through the perforations thereof and also through an annular passageway 81 between the member 74 and the periphery of the base plate 30 and the periphery of the shell 50.

In accordance with a feature of the present invention, the assembly 28 is provided with extremely simple means for directing fuel or gas to be burned into the chamber 60. More specifically, a fitting or nozzle 82 is secured to and extends through substantially the center of the base plate 30 and provides a single gas orifice 84. Gas is supplied to the nozzle under pressure from a source of supply and is directed in a thin high velocity stream or jet axially upwardly through the opening 70 and into the lower end of the chamber 60. A circular baffle plate or disc 86 preferably having a diameter less than the diameter of the opening 70 is disposed in axial alignment with the orifice 84 and in a lower end portion of the chamber 60 but slightly above the peripheral flange 64 of the bottom end member 62. The disc 86 is formed from a temperature resisting material such as stainless steel and is supported by a rod 88 which extends axially upwardly and is connected to the upper end member 54 by a threaded nut 90 or other suitable means.

As previously indicated, the fuel or gas is directed in a high velocity jet axially upwardly from the orifice 84. The gas jet impinges against the lower side of the disc or baffle 86 and is deflected substantially uniformly radially outwardly in all directions toward the lower end of the perforated shell 50 and primarily at least slightly above the bottom member 62. A pilot light device 92 is mounted on the base plate 30 in the chamber 72 for igniting the gas delivered to the chamber 60. The pilot light device may be of various known constructions for mixing gas with air and delivering the mixture to a discharge orifice 94 at the upper end thereof and thus, the device need not be described in detail. However, it is noted that the orifice 94 is in the form of a narrow transversely extending slot so that a portion of the pilot flame will be directed radially and axially inwardly to and through the aperture 70 for igniting the gas in the chamber 60. Another portion of the pilot flame will be directed generally radially outwardly for heating a thermocouple device 96 which may also be of known construction and is mounted on the base plate 30 within the chamber 72.

The main gas jet 82 and the pilot device 92 are respectively connected by tubes or gas conduits 98 and 100 with a thermostatically operated safety and control valve 102 mounted adjacent to periphery of the hood 20 by a bracket 104. In addition the thermocouple device 96 is connected by cable 106 with the control valve unit. The thermostatically operated control and safety valve unit 102 may be of known construction and need not be described in detail. It suffices to say that the valve unit is adapted to respond to heat delivered from the assembly 28 to control the delivery of gas to the main jet 82. Furthermore, the control valve unit is responsive to the theromcouple device 96 so as to prevent the delivery of fuel to the main jet in the event the pilot light is out.

It has been found that although the assembly 28 is of relatively simple construction and, for example, uses only a single gas jet, an extremely efficient utilization of the energy released from the burning fuel is obtained. More specifically, during operation of the assembly 28, the high velocity jet of fuel or gas is directed toward the baffle 86 without any substantial mixing with the surrounding air so that essentially no ignition of the fuel takes place in the space 72 between the orifice 84 and the deflector plate or baffle 86. As the gas spreads radially outwardly from the baffle or disc 86, it is converted from a compact, high velocity jet to a thin rapidly flowing sheet capable of mixing with the air entering through the opening 70. The diameters of the opening 70, the disc 86 and the shell 50 are correlated with each other and with the size of the gas jet and the spacing between the orifice and the disc and also with the location of the pilot light so that ignition of the fuel substantially begins at an area spaced radially outwardly from the periphery of the disc 86 and toward the wall of the shell 50. Thus a generally uniform annular sheet of burning gases is provided at the lower end of the shell 50 and as combustion continues the burning gases are deflected by the flange 64 and the shell and tend to flow vertically upwardly along and in intimate contact with the interior surfaces of the shell 50 whereby efficient heating of the shell by conduction as well as radiation is obtained. In addition the burning gases flow out through the numerous apertures 52 in the shell 50 for aiding in heating the shell more efficiently to a higher temperature and preferably to a red glow. The arrangement is such that combustion of the gases has been essentially completed by the time they emerge through the apertures 52. The hot products of combustion pass from the assembly 28 into the area beneath the hood 20 and subsequently out from beneath the periphery of the hood and aid in imparting heat to the surrounding area. However, heat for the poultry on the floor is primarily provided by the radiant energy and particularly the infrared heat waves emanating from the intensely heated shell 50 and surrounding parts of the assembly 28.

While a preferred embodiment of the present invention has been shown and described herein, it is obvious that many structural details may be changed without departing from the spirit and scope of the appended claims.

The invention is claimed as follows:

1. A poultry brooder comprising a hood, heat source means disposed beneath and secured with said hood, said heat source means including a generally upstanding shell having a substantially closed upper end and a lower end, fuel orifice means disposed for directing a non-burning and unconfined jet of fuel generally axially in said shell, a deflector member mounted in said shell substantially below said upper end and in alignment with and spaced from said orifice means for deflecting said non-burning jet of fuel into a relatively broad substantially uninterrupted sheet of non-burning fuel moving generally radially outwardly toward said shell, said shell being radially spaced from said orifice means for enabling the deflected fuel to mix with air and to be ignited adjacent a lower portion of said shell, and a plurality of orifice means in said shell for enabling hot and burning gases to flow therethrough, a bottom member traversing said lower end of said shell and having a central opening therethrough, said orifice means being disposed below said bottom member for directing said fuel jet upwardly through said opening, and said deflector member means disposed above and adjacent to said bottom member for directing the fuel generally radially outwardly in an annular sheet.

2. A poultry brooder, as defined in claim 1, wherein said shell includes a substantially cylindrical vertically extending sidewall, the ignited and burning fuel rising substantially vertically in intimate contact with said sidewall for promoting efficient heating of the sidewall.

3. A poultry brooder, as defined in claim 1, wherein said opening has a predetermined diameter, and said deflector member comprises a circular element having a diameter less than said predetermined diameter.

4. A poultry brooder, as defined in claim 1, which comprises means connected with said shell defining a chamber beneath said bottom member, said fuel orifice means being disposed for directing said fuel jet generally axially through said chamber, and a pilot light device mounted within said chamber for directing a pilot flame for avoiding contact with said fuel jet and toward an edge of said opening in the bottom member for igniting the fuel after impingement of the fuel against said deflector element.

5. A poultry brooder, as defined in claim 4, wherein said hood has a diameter substantially greater than said shell, said brooder including thermostatically actuated fuel control valve means mounted to said hood adjacent a peripheral edge thereof and connected to said fuel orifice means and said pilot light device and further connectible with a source of fuel supply.

6. In a poultry brooder having a downwardly directed heat reflecting hood, a heat source means mountable beneath said hood, said heat source means comprising sheet material shell means including an upper portion defining a first chamber and a lower portion defining a second chamber axially aligned with and beneath said first chamber, an end member closing an upper end of said first chamber, a bottom member substantially traversing a lower end of said second chamber, an intermediate transverse member between said first and second chambers and having a central opening therethrough, said shell means having a plurality of apertures through said upper portion thereof, orifice means mounted in said second chamber for directing an unconfined jet of gas axially into said first chamber, a deflector element mounted in a lower portion of said first chamber in alignment with said orifice means for deflecting the gas radially toward said shell means, and pilot light means mounted in said second chamber for igniting substantially only the deflected gas.

7. A heat source means for a poultry brooder as defined in claim 6, which includes an elongated rod secured to and depending from said end member crossing the upper end of the first chamber, said deflector element being secured to and supported by a lower end of said rod.

References Cited
UNITED STATES PATENTS 2,240,571  5/1941  Olson et al. _____ 119—32
2,985,137  5/1961  Horne _____ 119—32

SAMUEL KOREN, *Primary Examiner.*

HUGH R. CHAMBLEE, *Examiner.*